No. 612,883. Patented Oct. 25, 1898.
J. G. VAN MARTER.
COFFEE APPARATUS.
(Application filed Jan. 11, 1898.)
(No Model.)
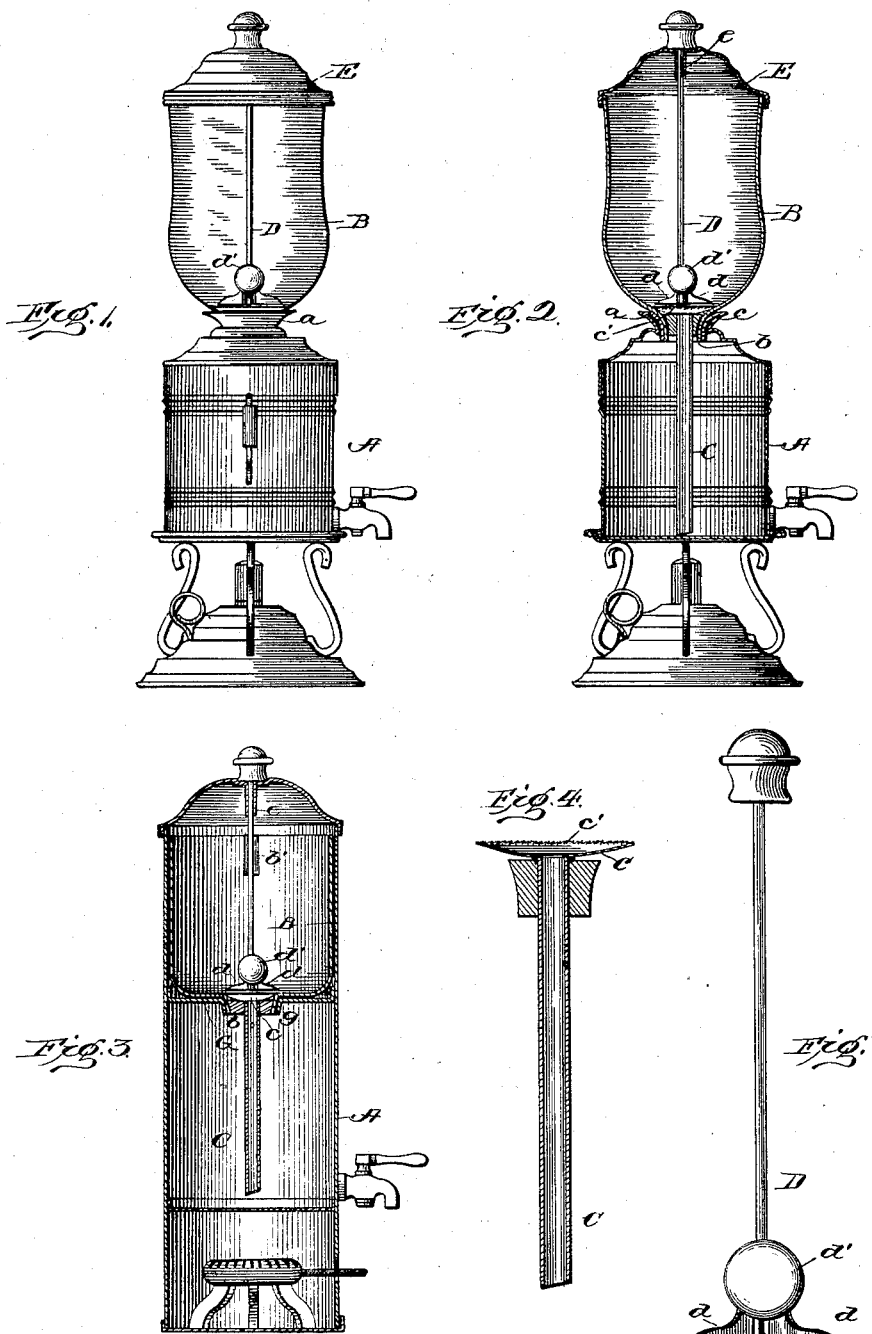

UNITED STATES PATENT OFFICE.

JAMES G. VAN MARTER, OF LYONS, NEW YORK.

COFFEE APPARATUS.

SPECIFICATION forming part of Letters Patent No. 612,883, dated October 25, 1898.

Application filed January 11, 1898. Serial No. 666,281. (No model.)

*To all whom it may concern:*

Be it known that I, JAMES G. VAN MARTER, a citizen of the United States, residing at Lyons, in the county of Wayne and State of New York, have invented certain new and useful Improvements in Coffee Apparatus; and I hereby declare the following to be a full, clear, and exact description of the invention, such as will enable others skilled in the art to which it appertains to make and use the same.

My improvements relate to that class of coffee apparatus in which the infusion or extraction of the essences of the coffee-berry is effected by the drip process—that is, by the passing of a current of water at the boiling-point through a body of the material in a pulverized form; and it consists in devices by which said process is effected in a closed space and substantially automatically, so that all the vapor and aroma generated in the process are retained within the closed infusion-chamber to mingle with and be absorbed by the liquid, instead of being allowed to escape, thus greatly improving the quality of the beverage and promoting a more complete extraction of the elements, with increased economy in the use of the material.

In the accompanying drawings, illustrating my invention, Figure 1 shows the preferred form of the same for ordinary or family use. Fig. 2 is a vertical sectional view of the same. Fig. 3 is a vertical sectional view of a form of the apparatus for operation on a larger scale, as in hotels or restaurants. Fig. 4 is a view in section of the tube or strainer detached, and Fig. 5 shows the combined stirring-rod and ball-float.

The apparatus consists, essentially, of two chambers, of which the lower chamber A is of metal in cylindrical form and mounted on a tripod or other support, within which may be placed a lamp or other source of heat. The upper chamber or urn B is preferably of glass or porcelain, of any preferred form, having at the bottom an open extension or neck $b$, adapted to fit a corresponding circular opening $a$ in the top of the chamber A, so that the two chambers may be firmly connected together.

C is a metal tube having a flaring, shallow, bowl-like, or conical expansion $c$ at its upper end, the curvature or form of said portion $c$ being conformed to that of the inner tapering surface of the chamber B near the outlet $b$. Across the top of the bowl $c$ is extended a sieve or strainer $c'$, so that when the tube C is inserted in the neck $b$ the outer surface and edge of the bowl portion will fit closely to the inner wall of chamber B, and said strainer will practically form the bottom or floor of said chamber. To secure steam-tight joints between the neck $b$ and opening $a$, the exterior of the neck $b$ is roughened and wound with linen tape or other suitable packing. The tube C also where it passes downward through the neck $b$ is packed with cork or other suitable material for the same purpose. The tube C when in position for use extends nearly to the bottom of chamber A.

D is a metal stirring-rod which passes through a vertical tubular socket $e$ in the cover E and terminates at its upper end in a knob or handle. At its lower end it is provided with two or more blades or wings $d$, which hang normally just above the surface of the strainer. In the form of the device shown in Fig. 3 and in any case when the chamber B is made of opaque material the rod is also provided with a hollow float $d'$, attached to its lower end immediately above the blades $d$.

The operation of the device is as follows: Water is first placed in the chamber A through the opening in its top. The urn or chamber B, having the tube C within and depending from it, is then placed upon chamber A, the neck $b$ entering the opening $a$ and being secured therein. The pulverized coffee is then placed in chamber B, resting upon the strainer $c'$. The cover, with the stirring-rod in place, is then added. Heat being applied beneath chamber A, as soon as steam begins to form its expansion forces the hot water up through the tube C into chamber B, passing through the strainer $c'$ and the bed of coffee lying thereon. The effect of the upward current through the bed of coffee is to scatter and distribute it through the body of hot water entering the chamber, so that all the particles are thoroughly exposed to the action of the water. As soon as the upward flow ceases the coffee settles to the bottom of the chamber. The source of heat being withdrawn the steam in chamber A condenses and the liquid descends through the tube C into the chamber A, again passing through the bed of coffee. If an infusion of moderate strength only is desired, it may then be drawn off through the faucet F; but for greater strength heat is again applied and the process repeated as often as may be desired. The strainer $c'$ is liable to become clogged by the deposit of coffee upon it, and in that case the rod D is to be rotated, the blades $d$ scraping the surface of the strainer and removing the obstruction. When the upper chamber or urn is of opaque material, the combined stirrer and float $d'$ is employed to indicate at any time by the rising or falling of the rod the quantity of liquid in the upper chamber. The vertical socket $e$ in the cover, through which the rod passes, keeps the same in a vertical position over the strainer.

In the form of the apparatus shown in Fig. 3 there is a body or casing of metal of cylindrical form, with a metal diaphragm or partition G extending horizontally across it. The removable chamber B, of metal or porcelain, is set within the outer casing and rests upon the partition G. Said partition has a central circular flanged opening $g$ to receive a corresponding neck $b$ in the bottom of the chamber or coffee-receptacle B, and through both the vertical tube C passes, the tube and strainer being constructed in the same manner and operating in the same way as in the other form of the device before described. Handles $b'$ may be attached to the removable chamber to lift it out of the casing.

The apparatus described forms an effective and convenient means for the preparation of coffee, securing the thorough extraction of all the desirable elements without any loss of the volatile aromatic portions thereof, and is automatic to such an extent that the process may be carried on on the table or sideboard with a very slight amount of manipulation or attention on the part of the operator.

My improved construction and adjustment of the connecting-tube, strainer, stirring-rod, and float greatly facilitate the operation of the apparatus.

I claim as my invention and desire to secure by Letters Patent—

1. In a coffee apparatus the combination of the lower and upper chambers, the tube connecting said chambers, the cup at the upper end of said tube set in the bottom of said upper chamber, the strainer stretched across the upper edge of said cup, and the revoluble stirring-rod passing through and depending vertically from the cover and carrying at its lower end the radial blades and float, substantially as set forth.

2. In a coffee apparatus the combination of an outer casing divided into two chambers by a horizontal partition having an opening in its center, a removable coffee-receptacle within the upper chamber, resting on said partition and having a corresponding central opening or neck, a vertical connecting-pipe having a cup and strainer at its top fitted in the bottom of the coffee-receptacle and extending downward through said partition into the lower chamber, and a stirring-rod passing through and depending vertically from the cover and carrying at its lower end the radial blades and float, substantially as set forth.

In testimony whereof I affix my signature in presence of two witnesses.

JAMES G. VAN MARTER.

Witnesses:
S. B. GAVITT,
THEO. FRIES.